UNITED STATES PATENT OFFICE.

HERBERT ABRAHAM, OF NEW YORK, N. Y.

PLASTIC CEMENT AND PROCESS OF MAKING SAME.

1,253,454.  Specification of Letters Patent.  Patented Jan. 15, 1918.

No Drawing.  Application filed March 28, 1917.  Serial No. 157,913.

*To all whom it may concern:*

Be it known that I, HERBERT ABRAHAM, a citizen of the United States, residing at the city, county, and State of New York, have invented certain new and useful Improvements in Plastic Cements and Processes of Making Same, of which the following is a specification.

My invention relates to the production of plastic cement from the waste material resulting from the manufacture of so-called "prepared" or "composition" roofings or shingles, or insulating papers, or sheathing papers.

Such products consist generally of a foundation material, such as roofing felt or paper stock, composed of felted or matted animal or vegetable fibers, which is saturated or impregnated with bituminous matter of varying consistency and is either unfaced, or faced with a bituminous compound of harder consistency than the saturating compound. In certain cases, as in the manufacture of "mineral surfaced prepared roofing" or "prepared roofing shingles," the product is coated with particles of crushed slate or other mineral matter embedded in the surface.

In the manufacture of those products it is practically impossible to avoid producing a certain amount of "waste" either in the form of short lengths or else material which has not been properly impregnated or surfaced. Heretofore these culls have either been destroyed by the manufacturer or else in certain cases marketed as "seconds" at a reduced price.

I have discovered that this waste material can be utilized to produce a plastic cement which gives excellent results for waterproofing work and also for repairing leaky roofs. This product can be produced in a plastic state so that it can be applied cold with a trowel and after application will harden to a tough, flexible, weather-proof coating.

In the practice of my invention I first break down or disintegrate the structure of the waste material, then, if necessary, I add a proportion of asphalt to secure the proper balance between the bituminous matters present and the fibrous material, and finally I bring the mass to a plastic consistency by adding a relatively small proportion of volatile solvent.

In the case where the waste material is not surfaced with coarse mineral particles, the first step consists of breaking down the structure of the foundation fabric either by forcing the material under great pressure through perforated metal plates, or else by passing the material through a set of metal rollers squeezed close together under great pressure. This will break up the felted or matted structure of the foundation fabric without materially shortening the fibers of which it is composed.

In the case of waste material surfaced with mineral particles, such as angular fragments of slate, etc., it is necessary to subject the material to an operation which will reduce the mineral fragments to a fine powder. This may be accomplished and at the same time the felt structure broken down by passing the mineral surfaced material through the steel rollers squeezed close together under pressure, although any other equivalent means may be used for this purpose. For example, the mineral matter may be crushed by means of pneumatic hammers or other impact devices.

The waste material after being thus treated is transferred to a mixing or kneading machine, and mixed, either cold or under the influence of heat, with a suitable proportion of asphalt and solvent. The kneading, mixing or triturating should be continued until the mass becomes homogeneous and attains a plastic or buttery consistency.

The character of the asphalt added should be such that when incorporated with the other bituminous materials present in the waste, the mixture will withstand the sun's temperature without melting or running, and it should be added in such quantity so that when the volatile solvent is incorporated, the material will attain a consistency which will enable it to be troweled easily. This would be prevented if the fibers were present in excess, and regardless of the quantity of solvent used. In practice I have found that a finished product containing approximately 10% of fibers and 20% of solvent (based on the finished weight) gives very good results. The balance should consist of the bituminous materials present in the waste material, the added asphalt and the finely pulverized mineral matter derived from the mineral surfacing. Although the mineral matter has the advantage of toughening and at the same time reducing the cost of the finished product, its presence, however, is not entirely essential.

The presence of 20% of finely powdered mineral matter in the finished product will give good results, although this may be increased or decreased at will. Where waste material without mineral surfacing is used, the mineral matter may be added separately, and may consist of finely powdered non-fibrous mineral such as clay, limestone, talc or silicious material.

The volatile solvent may be composed of petroleum distillate, coal tar distillate or turpentine, such solvents being substantially completely volatile at normal atmospheric temperatures.

The waste bituminous fibrous material without mineral surfacing may be used separately or in combination with the waste derived from the mineral surfaced roofings or shingles.

The term "bituminous waste material containing non-mineral fibers" is used herein to denote a material containing felt or paper stock, impregnated, coated, prepared or otherwise treated with bituminous matter.

What I claim is:

1. The process of treating bituminous waste material containing non-mineral fibers which comprises mechanically disintegrating the material and reducing the resultant mass to a plastic consistency by addition of volatile solvent.

2. The process of treating bituminous waste material containing non-mineral fibers which comprises first breaking down the material by application of pressure, and then adding sufficient volatile solvent to bring the resultant mass to a plastic consistency.

3. The process of producing a plastic cement from bituminous waste material containing non-mineral fibers which consists in disintegrating the material, adding bituminous matter, and reducing the mixture to a plastic consistency by addition of volatile solvent.

4. The process of producing a plastic cement from bituminous waste material containing non-mineral fibers which consists in first mechanically breaking down the material, then adding bituminous matter and volatile solvent, and finally working the mixture to a homogeneous mass of plastic consistency.

5. The process of producing a plastic cement from bituminous waste material containing non-mineral fibers which consists in first mechanically breaking down the material, then adding bituminous matter, finely powdered non-fibrous mineral matter and volatile solvent, and finally working the mixture to a homogeneous mass of plastic consistency.

6. A product of plastic consistency containing non-mineral fibers, bituminous matter, and solvent which is substantially completely volatile at normal atmospheric temperatures.

7. A product of plastic consistency containing non-mineral fibers, bituminous matter, solvent which is substantially completely volatile at normal atmospheric temperatures, and finely powdered non-fibrous mineral matter.

8. A product of plastic consistency containing bituminous matter, together with approximately 10% of non-mineral fibers and 20% of solvent which is substantially completely volatile at normal atmospheric temperatures.

9. A product of plastic consistency containing bituminous matter, together with approximately 10% of non-mineral fibers, 20% of solvent which is substantially completely volatile at normal atmospheric temperatures, and 20% of finely powdered non-fibrous mineral matter.

HERBERT ABRAHAM.